United States Patent
Bonin et al.

(10) Patent No.: US 6,798,609 B1
(45) Date of Patent: Sep. 28, 2004

(54) MAGNETIC MICROACTUATOR WITH CAPACITIVE POSITION SENSOR

(75) Inventors: Wayne A. Bonin, North Oaks, MN (US); Peter Crane, Richfield, MN (US); Zine-Eddine Boutaghou, Vadnais Heights, MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/490,420

(22) Filed: Jan. 24, 2000

Related U.S. Application Data

(60) Provisional application No. 60/146,244, filed on Jul. 28, 1999.

(51) Int. Cl.⁷ .......................... G11B 5/596; G11B 21/24
(52) U.S. Cl. ............................... 360/78.05; 360/78.12; 360/294.5; 324/207.16
(58) Field of Search .......................... 360/78.12, 78.05, 360/75, 294.3, 294.1, 294.2, 294.4, 294.5, 294, 294.6, 264.5, 245.4, 245.3; 310/309; 324/207.16

(56) References Cited

U.S. PATENT DOCUMENTS

| | | | |
|---|---|---|---|
| 3,924,268 A | 12/1975 | McIntosh et al. | 360/78 |
| 4,374,402 A | 2/1983 | Blessom et al. | 360/104 |
| 4,651,242 A | 3/1987 | Hirano et al. | 360/103 |
| 4,764,829 A | 8/1988 | Makino | 360/106 |
| 4,914,725 A | 4/1990 | Belser et al. | 318/560 |
| 5,021,906 A | 6/1991 | Chang et al. | 360/103 |
| 5,034,828 A | 7/1991 | Ananth et al. | 360/75 |
| 5,115,664 A | 5/1992 | Hegde et al. | |
| 5,177,652 A | 1/1993 | Yamaguchi et al. | 360/78.05 |
| 5,189,578 A | 2/1993 | Mori et al. | 360/106 |
| 5,303,105 A | 4/1994 | Jorgenson | 360/106 |
| 5,364,742 A | 11/1994 | Fan et al. | 430/317 |
| 5,375,033 A | 12/1994 | MacDonald | 361/281 |
| 5,521,778 A | 5/1996 | Boutaghou et al. | 360/106 |

(List continued on next page.)

FOREIGN PATENT DOCUMENTS

| | | | |
|---|---|---|---|
| EP | 0 412 221 B1 | 11/1989 | |
| JP | 63-122069 | 5/1988 | |
| JP | 02-263369 | 4/1989 | |
| JP | 04-134681 | 5/1992 | |
| JP | 04-368676 | 12/1992 | |
| JP | 05-094682 | 4/1993 | G11B/21/21 |
| JP | 06-020412 | 1/1994 | |
| JP | 07-085621 | 3/1995 | G11B/21/20 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

*Primary Examiner*—Andrew L. Sniezek
(74) *Attorney, Agent, or Firm*—Kinney & Lange, P.A.

(57) ABSTRACT

A disc drive system includes a recording disc rotatable about an axis, a slider supporting a transducing head for transducing data with the disc, and a dual-stage actuation assembly supporting the slider to position the transducing head adjacent a selected radial track of the disc. The dual-stage actuation assembly includes a support structure supporting the slider in proximity to a surface of the disc, a microactuator and a capacitive position sensor. The support structure is coarsely positionable by a main actuator. The microactuator includes a stator attached to the support structure and a movable rotor operatively attached to the slider, the rotor being connected to the stator by at least one flexible beam. The capacitive position sensor connects the stator to the rotor, and provides a relative position signal representing a state of displacement of the microactuator.

13 Claims, 4 Drawing Sheets

U.S. PATENT DOCUMENTS

| | | | |
|---|---|---|---|
| 5,657,188 A | | 8/1997 | Jurgenson et al. ........... 360/106 |
| 5,745,319 A | | 4/1998 | Takekado et al. ......... 360/78.05 |
| 5,764,444 A | | 6/1998 | Imamura et al. ............. 360/109 |
| 5,781,381 A | | 7/1998 | Koganezawa et al. ...... 360/106 |
| 5,796,558 A | | 8/1998 | Hanrahan et al. ........... 360/106 |
| 5,801,472 A | | 9/1998 | Wada et al. ................. 310/309 |
| 5,805,375 A | | 9/1998 | Fan et al. ................. 360/78.12 |
| 5,847,280 A | * | 12/1998 | Sherman et al. .......... 73/514.32 |
| 5,856,896 A | | 1/1999 | Berg et al. .................... 360/104 |
| 5,862,015 A | | 1/1999 | Evans et al. |
| 5,867,347 A | | 2/1999 | Knight et al. ................ 360/104 |
| 5,896,246 A | | 4/1999 | Budde et al. ................ 360/104 |
| 5,898,541 A | | 4/1999 | Boutaghou et al. .......... 360/109 |
| 5,898,544 A | | 4/1999 | Krinke et al. ................ 360/104 |
| 5,920,441 A | | 7/1999 | Cunningham et al. ... 360/78.05 |
| 5,936,805 A | | 8/1999 | Imaino ........................ 360/104 |
| 5,943,189 A | | 8/1999 | Boutaghou et al. |
| 5,959,808 A | | 9/1999 | Fan et al. ..................... 360/106 |
| 6,103,622 A | * | 8/2000 | Huang ......................... 438/652 |
| 6,121,552 A | * | 9/2000 | Brosnihan et al. .......... 174/253 |
| 6,194,892 B1 | * | 2/2001 | Lin et al. ............... 324/207.16 |
| 6,548,843 B2 | * | 4/2003 | Wickramasinghe et al. . 257/295 |

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural PiggyBack Milli–Actuator for Over 5 Gbit/in$^2$ Density Magnetic Recording" by Koganezawa et al., *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub–micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

* cited by examiner

US 6,798,609 B1

MAGNETIC MICROACTUATOR WITH CAPACITIVE POSITION SENSOR

CROSS-REFERENCE TO RELATED APPLICATION(S)

This application claims priority from Provisional Application No. 60/146,244 filed Jul. 28, 1999 for "Magnetic Microactuator With Capacitive Position Sensing" by W. Bonin, P. Crane and Z. Boutaghou.

BACKGROUND OF THE INVENTION

The present invention relates to a disc drive microactuator, and more particularly to a microactuator employing a capacitive position sensor to indicate the relative position of the microactuator rotor with respect to the stator during operation of the microactuator.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dual-stage actuation. Various microactuator designs have been considered to accomplish high resolution head positioning. One successful microactuator design is disclosed in copending U.S. application Ser. No. 09/315,006, entitled "Magnetic Microactuator," filed May 19, 1999 by P. Crane, W. Bonin and B. Zhang, which is hereby incorporated by reference.

In addition to the advances in the movement mechanisms of microactuators, it is also desirable to provide an apparatus to indicate a relative position of the microactuator rotor with respect to the stator. Such an apparatus is provided by the present invention.

BRIEF SUMMARY OF THE INVENTION

The present invention is a disc drive system employing a microactuator and a capacitive position sensor to provide information relating to the relative position of the microactuator. The disc drive system includes a recording disc rotatable about an axis, a slider supporting a transducing head for transducing data with the disc, and a dual-stage actuation assembly supporting the slider to position the transducing head adjacent a selected radial track of the disc. The dual stage actuation assembly includes a support structure supporting the slider in proximity to a surface of the disc, the support structure being coarsely positionable by a main actuator. A microactuator is also provided as part of the dual-stage actuation assembly, including a stator attached to the support structure and a movable rotor operatively attached to the slider, the rotor being connected to the stator by at least one flexible beam. A capacitive position sensor is employed connecting the stator to the rotor, the capacitive position sensor providing a relative position signal representing a state of displacement of the microactuator.

DETAILED DESCRIPTION

Figure 1:
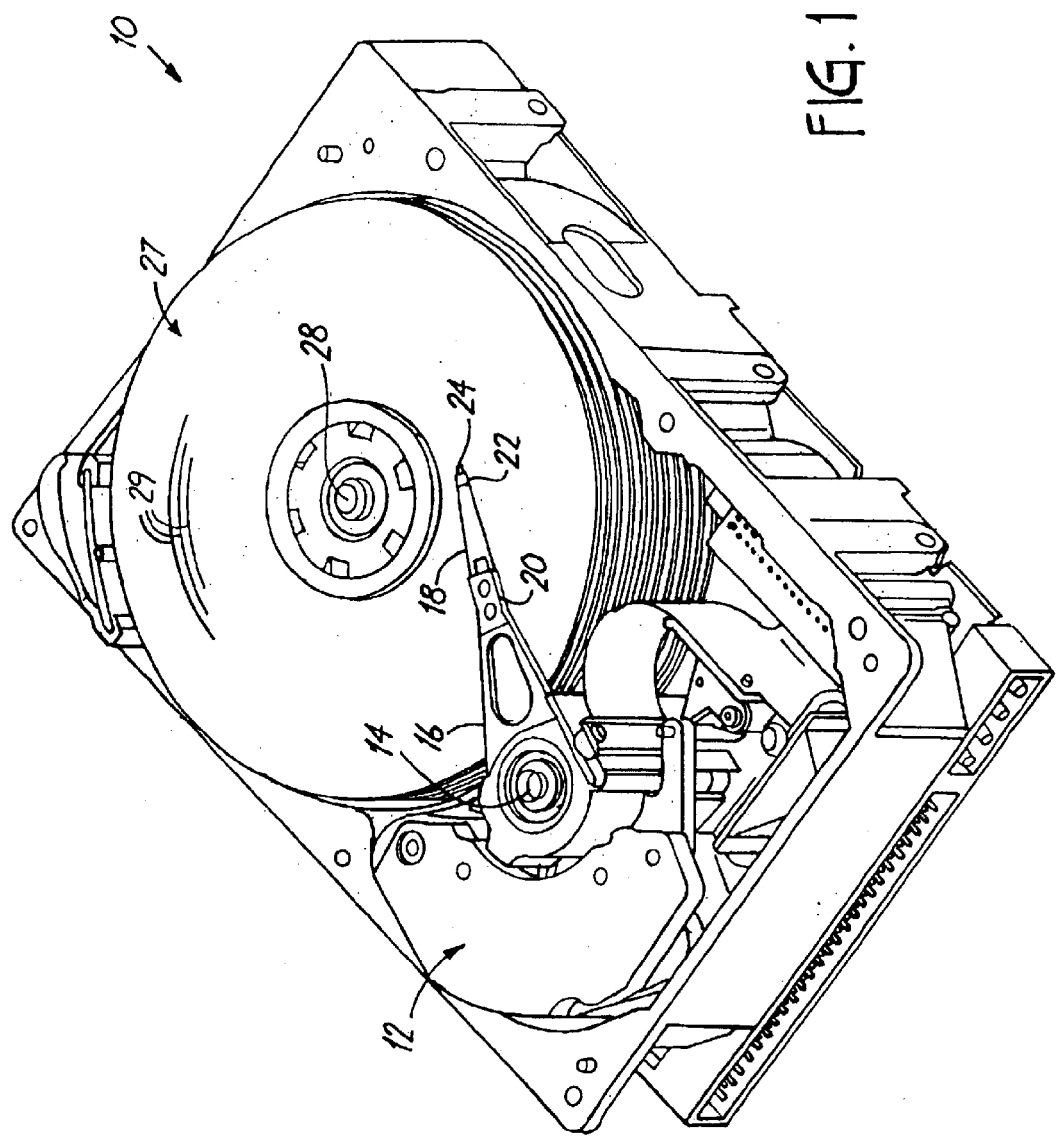
FIG. 1 is a plan view of a disc drive actuation system for positioning a slider over tracks of a disc.

FIG. 1 is a plan view of a disc drive actuation system, 10 for positioning slider 24 over a track 29 of disc 27. Actuation system 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on concentric tracks of disc 27. Disc 27 rotates around axis 28, so that windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely over a selected track 29 of disc 27. Therefore, a higher resolution actuation device is necessary.

Figure 2:
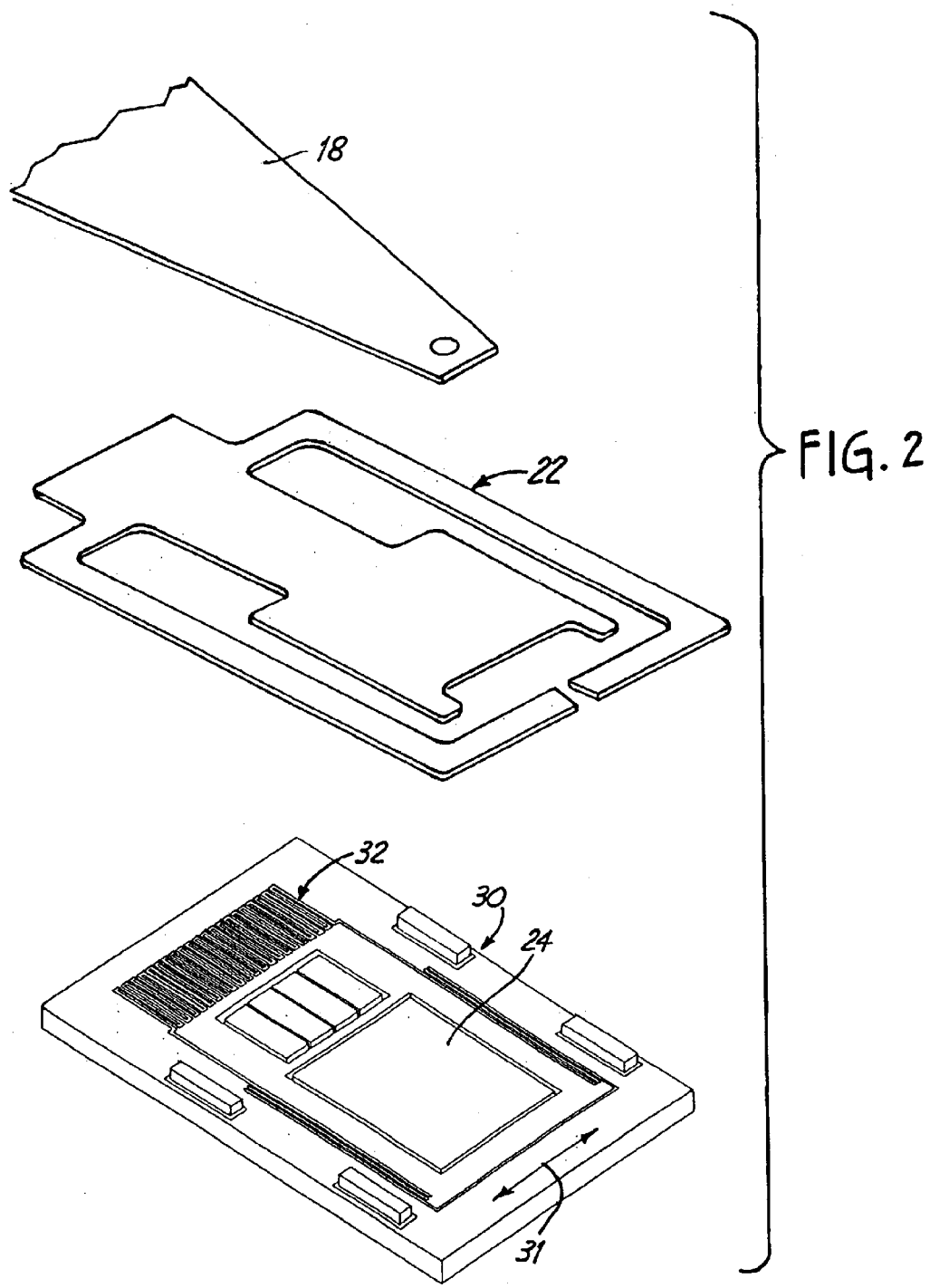
FIG. 2 is an exploded perspective view of a portion of a disc drive including a microactuator employing a capacitive position sensor according to the present invention.

FIG. 2 is an exploded perspective view of a portion of a disc drive including microactuator 30 according to the present invention. Flexure 22 is attached to load beam 18, and microactuator 30 is attached to flexure 22 to carry slider 24 above a surface of disc 27 (FIG. 1). A transducing head (not shown) is carried by slider 24 to transduce data with the disc. Capacitive position sensor 32 is provided on microactuator 30 to enable a relative position status of microactuator 30 to be determined.

In operation of the disc drive, load beam 18, flexure 22 and microactuator 30 carrying slider 24 are all moved together as coarse positioning is performed by VCM 12 (FIG. 1) moving actuator arm 16 (FIG. 1). To achieve fine positioning of the transducing head, microactuator 30 generates a force which causes bending of the beam springs of the microactuator. As a result, the portion of microactuator 30 carrying slider 24 moves slightly with respect to flexure 22 in the direction of arrows 31, displacing the transducing head carried by slider 24 with high resolution for precise positioning over a selected track of the disc. A relative position signal is provided by capacitive sensor 32 to indicate the state of displacement of microactuator 30 during operation thereof.

Figure 3:
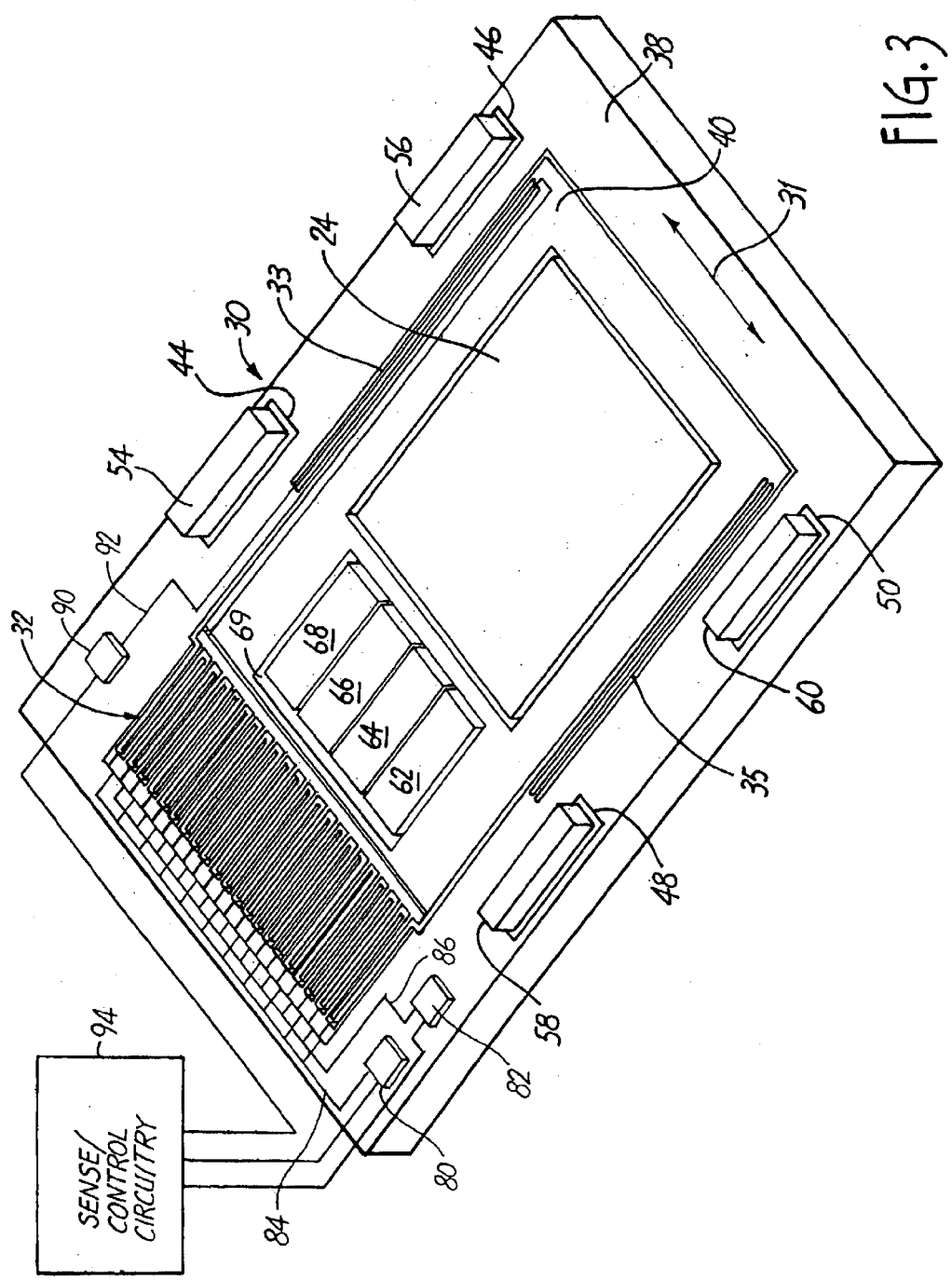
FIG. 3 is a perspective view of a microactuator system employing a capacitive position sensor according to the present invention for positioning and sensing the relative position of a slider over the tracks of a disc.

FIG. 3 is a perspective view of microactuator 30 according to the present invention. Microactuator 30 includes outer frame 38 serving as the microactuator stator, and inner frame 40 serving as the microactuator rotor. Inner frame 40 is connected to outer frame 38 by beams 33 and 35, which are deformable in response to lateral force applied by lateral movement of magnets 62, 64, 66 and 68 to alter the position of inner frame 40 (and thus slider 24) with respect to fixed outer frame 38. A tub 69 having a bottom surface lined with a ferromagnetic keeper material, such as cobalt-iron (CoFe) in one embodiment, is formed in the substrate of microactuator 30 opposite the transducing head carried at the trailing edge of slider 24. Magnets 62, 64, 66 and 68 are located in tub 69, attached to the ferromagnetic lining on the bottom surface of tub 69. In an exemplary embodiment, magnets 62, 64, 66 and 68 are composed of samarium-cobalt (SmCo) or a similar magnetic material. An embodiment employing only two microactuator magnets may also be used. Standoffs 54, 56, 58 and 60 are formed on respective standoff bases 44, 46, 48 and 50 on outer microactuator frame 38, to be borne upon so as to apply pre-load force to microactuator 30 as it supports slider 24 over the surface of the disc. The configuration of magnets 62, 64, 66 and 68, the ferromagnetic lining of tub 69 and a coil and top keeper provided on the overhanging flexure (such as flexure 22, FIG. 2) creates a vertical magnetic circuit that is operable to cause lateral movement of magnets 62, 64, 66 and 68 and therefore move microactuator inner frame 40 with respect to outer frame 38. The details of the movement generated by microactuator 30 are discussed in the aforementioned U.S. application Ser. No. 09/315,006, which has been incorporated herein by reference.

Capacitive position sensor 32 is provided between magnets 62, 64, 66 and 68 and the leading edge of microactuator 30 to generate a signal representative of the relative movement of magnets 62, 64, 66 and 68 and inner frame 40 with respect to outer frame 38 of microactuator 30. Bond pads 80 and 82 are provided on outer frame 38, and conductive traces 84 and 86 are arranged to electrically connect alternate electrode panels of capacitive position sensor 32 that are connected to outer frame 38 to respective bond pads 80 and 82. Bond pad 90 is provided on outer frame 38, and conductive trace 92 is arranged to traverse flexible beams 33 to electrically contact the electrode panels of capacitive position sensor 32 that are connected to inner frame 40. Bond pads 80, 82 and 90 are operatively connected to sense/control circuitry 94 in a manner known in the art, such as by an overhanging flex circuit in one embodiment. Sense/control circuitry 94 is operable to correlate the changing capacitance of capacitive position sensor 32 to a relative position of microactuator 30. The details of the construction and operation of capacitive position sensor 32 are discussed below with respect to FIG. 4.

Figure 4:
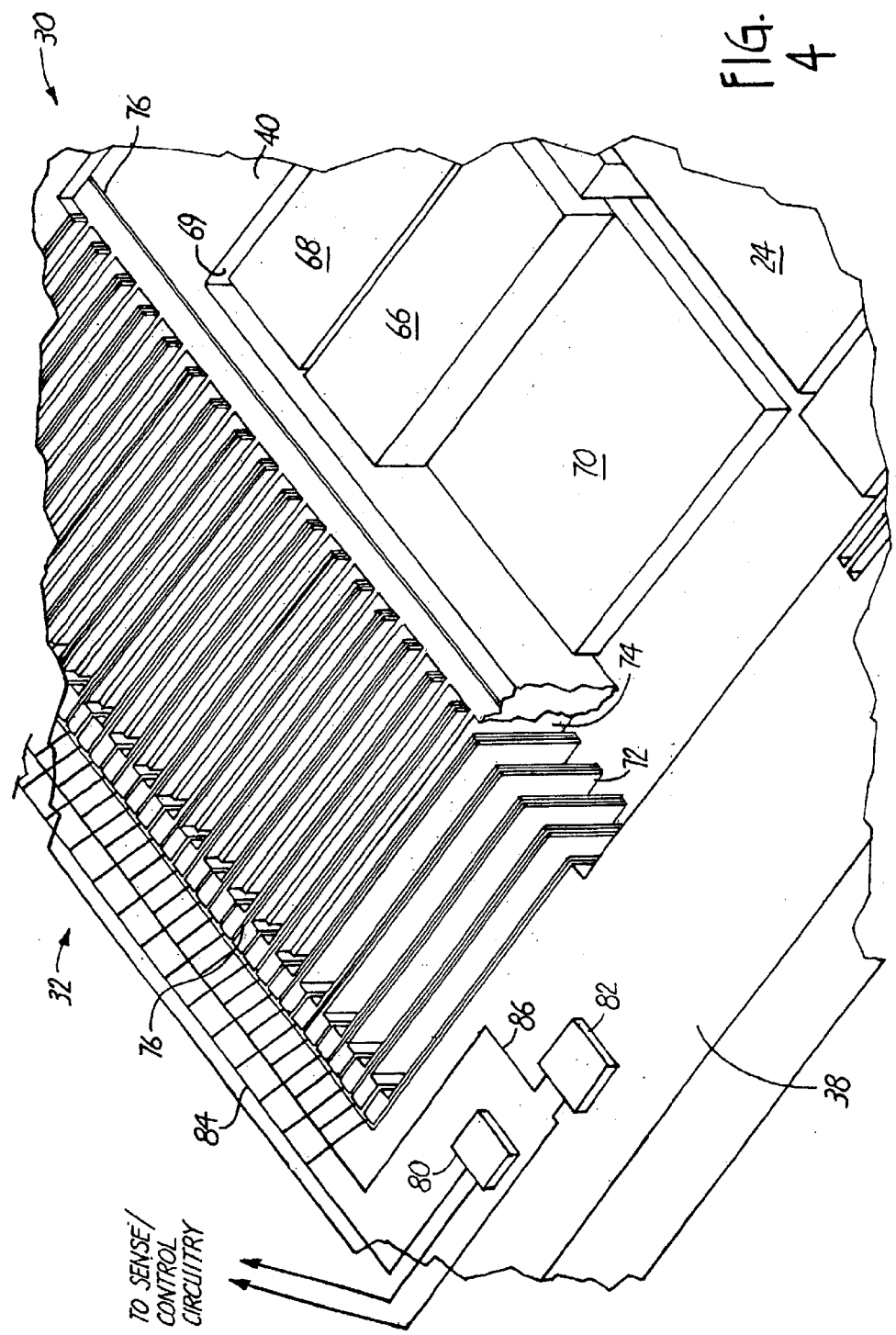
FIG. 4 is an enlarged perspective view of a portion of the microactuator system employing the capacitive position sensor according to the present invention.

FIG. 4 is an enlarged perspective view of a portion of microactuator 30 employing capacitive position sensor 32 according to the present invention. In the drawing of FIG. 4, some of the microactuator magnets are removed and a portion of inner microactuator frame 40 is cut away to more clearly depict the configuration of capacitive position sensor 32. Sensor 32 includes electrode panels 72 attached to outer microactuator frame 38 interdigitated with electrode panels 74 attached to inner microactuator frame 40. When microactuator 30 is operated to laterally move inner frame 40 with respect to outer frame 38, the configuration of the gaps between electrode panels 72 and electrode panels 74 is altered. Patterned insulator 76 is provided in electrode panels 72 and 74 in such a manner that divides each of electrode panels 72 into two portions. The portions of electrode panels 72 on opposite sides of each of the interdigitated electrode panels 74 are connected to respective bond pads 80 and 82. A differential voltage is applied between electrode panels 74 and the portions of electrode panels 72. As the dimension of the gap between electrode panels 72 and electrode panels 74 changes due to movement of microactuator inner frame 40 with respect to outer frame 38, the capacitance associated with the electrode panels also changes, according to the following formula:

$$C = \frac{\varepsilon A}{d}$$

where C is the capacitance between the electrode panels, $\varepsilon$ is the permittivity of the gap region between the electrode panels, A is the area of the electrode panels, and d is the gap distance between the electrode panels. The capacitance between electrode panels 72 and 74 can be measured by conventional sense/control circuitry 94 known in the art, and capacitance values can be correlated with states of movement of microactuator 30 in such a manner that capacitive position sensor 32 provides a signal representative of the relative position of microactuator inner frame 40 with respect to outer frame 38.

Since the capacitance between electrode panels 72 and 74 is directly proportional to the area of the electrode panels, a larger electrode panel area will provide larger values of capacitance. Large electrode panel areas also provide a lower source impedance to the sense amplifier connected to capacitive position sensor 32. Capacitive position sensor 32 therefore must be designed so that electrode panels 72 and 74 have a sufficient area to provide a signal to noise ratio (SNR) greater than a predetermined threshold for the sense amplifier and capacitance measuring circuit connected thereto. In an exemplary embodiment, electrode panels 72 and 74 have a length of about 500 micro-meters ($\mu$m) and a height (equal to the microactuator wafer thickness) of about 200 $\mu$m, giving an area of about 100,000 $\mu$m$^2$. With a nominal gap of 20 $\mu$m between electrode panels 72 and 74, the sense capacitance is about 1.0 pico-Farads (pF). This value of capacitance, as well as the changes in capacitance due to gap changes on the order of a few micrometers or less, are large enough that the capacitance sensing circuitry may be located at least several inches from electrode panels 72 and 74, while still achieving a sufficient SNR for effective operation. With such a configuration, a single remotely placed chip could be used to drive all of the capacitive position sensors on a multiple head stack disc drive. In another embodiment, multiple drive circuit chips may be located directly at each capacitive position sensor 32 in the head stack, which would improve the SNR and enable a reduction in the length of electrode panels 72 and 74 to about 50 $\mu$m or less.

In addition to providing a signal representative of the relative movement of microactuator 30, the interdigitated electrode configuration of capacitive position sensor 32 also acts as a viscous damper to reduce the amplitude of resonant vibrations in the microactuator structure. The damping effect of electrode panels 72 and 74 can be particularly beneficial for high frequency resonant vibrations beyond the servo bandwidth of the positioning system. For resonant vibration at a frequency lower than the servo bandwidth, active damping may be performed by initiating microactuator movement to cancel out the resonant vibrations sensed by capacitive position sensor 32.

The present invention has been described above with capacitive position sensor 32 located toward the leading edge of microactuator 30. However, it should be understood that capacitive position sensor 32 may also be located between microactuator inner frame 40 and outer frame 38 at the trailing edge of microactuator 30 as well. In some arrangements, locating electrode panels 72 and 74 of capacitive position sensor 32 at the trailing edge of microactuator 30 serves to improve the vibration damping effects of the device.

Although the present invention has been described with reference to preferred embodiments, workers skilled in the art will recognize that changes may be made in form and detail without departing from the spirit and scope of the invention.

What is claimed is:

1. A capacitive position sensor for providing a relative position signal representing a state of displacement of a microactuator and comprising:

a first plurality of electrode panels attached to a stator of the microactuator, each of the first plurality of electrode panels comprising a first electrode portion, a patterned insulator adjacent the first electrode portion, and a second electrode portion adjacent the patterned insulator, such that the patterned insulator divides the electrode panel into parallel first and second electrode portions;

a second plurality of electrode panels attached to a rotor of the microactuator and interdigitated with the first plurality of electrode panels; and sensing circuitry electrically connected to the first and second portions of the first plurality of electrode panels and to the second plurality of electrode panels, to provide differential voltages between the second plurality of electrode panels and each of the first and second portions of the first plurality of electrode panels to determine capacitances therebetween and correlate the capacitances to a relative position of the rotor of the microactuator with respect to the stator.

2. The capacitive position sensor of claim 1, wherein the first plurality of electrode panels and the second plurality of electrode panels each have an area of about 100,000 square micro-meters.

3. The capacitive position sensor of claim 2, wherein the first plurality of electrode panels and the second plurality of electrode panels have a nominal spacing therebetween of about 20 micro-meters.

4. The capacitive position sensor of claim 3, wherein the first plurality of electrode panels and the second plurality of electrode panels have a nominal capacitance therebetween of about 1.0 pico-Farads.

5. The capacitive position sensor of claim 1, wherein the microactuator is attached to a support structure and has a leading portion adjacent to the support structure and a trailing portion distant from the support structure, and wherein the capacitive position sensor is located on the leading portion of the microactuator.

6. The capacitive position sensor of claim 1, wherein the microactuator is attached to a support structure and has a leading portion adjacent to the support structure and a trailing portion distant from the support structure, and wherein the capacitive position sensor is located on the trailing portion of the microactuator.

7. A capacitive position sensor comprising:

a plurality of electrode panels attached to a stator of a microactuator, each panel comprising a first electrode, a patterned insulator adjacent the first electrode, and a second electrode adjacent the patterned insulator, such that the patterned insulator divides the electrode panel into parallel first and second electrodes;

a plurality of third electrodes attached to a rotor of the microactuator and each arranged to extend between the first electrode of one panel and the second electrode of another panel; and sensing circuitry electrically connected to the first, second and third electrodes to provide differential voltages between the first and third electrodes and the second and third electrodes and to determine capacitances therebetween and correlate the capacitances to a relative position of the rotor of the microactuator with respect to the stator.

8. The capacitive position sensor of claim 7, wherein each of the plurality of first electrodes and the plurality of second electrodes have an area of about 100,000 square micro-meters.

9. The capacitive position sensor of claim 8, wherein the plurality of first electrodes and the plurality of second electrodes have a nominal spacing therebetween of about 20 micro-meters.

10. The capacitive position sensor of claim 9, wherein the plurality of first electrodes and the plurality of second electrodes have a nominal capacitance therebetween of about 1.0 pico-Farads.

11. The capacitive position sensor of claim 7, wherein the microactuator is attached to a support structure has a leading portion adjacent to the support structure and a trailing portion distant from the support structure, and wherein the capacitive position sensor is located on the leading portion of the microactuator.

12. The capacitive position sensor of claim 7, wherein the microactuator is attached to a support structure and has a leading portion adjacent to the support structure and a trailing portion distant from the support structure, and wherein the capacitive position sensor is located on the trailing portion of the microactuator.

13. A capacitive position sensor for providing a relative position signal representing a state of displacement of a microactuator and comprising:

a first plurality of electrode panel attached to a stator of the microactuator, each of the first plurality of electrode panels comprising a first electrode portion, a patterned insulator adjacent the first electrode portion, and a second electrode portion adjacent the patterned insulator, such that the patterned insulator divides the electrode panel into parallel first and second electrode portions;

a second plurality of electrode panels attached to a rotor of the microactuator and interdigitated with the first plurality of electrode panels; and sensing circuitry electrically connected to the first and second portions of the first plurality of electrode panels and to the second plurality of electrode panels.

* * * * *